United States Patent Office 2,815,924
Patented Dec. 10, 1957

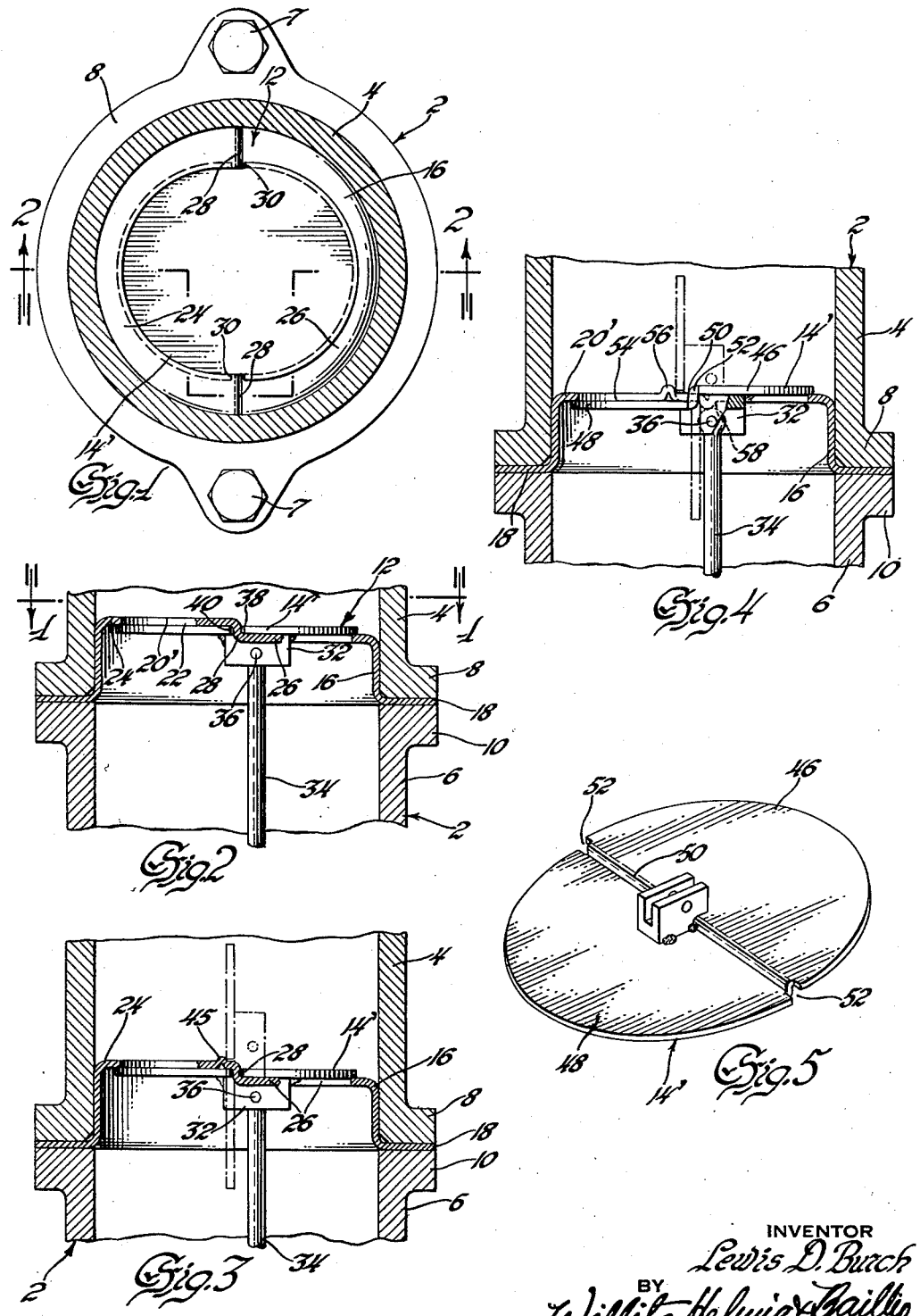

2,815,924

BUTTERFLY VALVE STRUCTURE

Lewis D. Burch, Dearborn, Mich., assignor to General Motors Corporation, Detroit, Mich., a corporation of Delaware Application October 14, 1952, Serial No. 314,635

7 Claims. (Cl. 251—305)

This invention relates to valve structures and more particularly to valve structures of the shaftless butterfly valve type.

Valves of the butterfly type are use extensively for various purposes since they are usually balanced and therefore require a minimum effort to operate. Such valves also may be readily installed and permit substantially free flow of fluid therethrough when in open position. Valves of this general type employed heretofore either are mounted on pivot shafts and therefore are relatively expensive to manufacture or are so constructed that the operation thereof is rendered difficult because of binding between the valve and valve seat. This often prevents proper seating of the valve which results in undue leakage between the valve and seat.

One object of the present invention is to provide a novel butterfly valve structure of the shaftless type which is so constructed that seating thereof will be assured under all conditions of operation.

Another object is to provide a valve structure of the stated type which is extremely simple in construction and which may be manufactured at a relatively low cost.

Other and further objects of the invention will become apparent as the description thereof progresses.

Of the drawings:

Fig. 1 is a plan view, partly in section, of one form of valve structure comprising the present invention, said view being taken substantially along line 1—1 of Fig. 2.

Fig. 2 is a sectional elevational view of the structure shown in Fig. 1, said view being taken substantially along line 2—2 of Fig. 1.

Fig. 3 is a view similar to Fig. 2 showing a slightly modified construction.

Fig. 4 is a view similar to Figs. 2 and 3 but showing a further modification, and Fig. 5 is a perspective view of the butterfly valve shown in Fig. 4.

Referring to the drawings, the numeral 2 indicates a conduit consisting of a pair of axially aligned pipe sections 4 and 6 which may be attached by any suitable securing means, such as by bolts 7 extending through the companion flanges 8 and 10, respectively, thereof. The valve structure is indicated generally by the numeral 12 and comprises a butterfly type of valve 14' and a valve seat 16, the latter of which having an annular flange 18 which extends between and is secured to the companion flanges 8 and 10 of pipe sections 4 and 6. The upper portion 20' of valve seat 16 is generally circular in construction and is provided with a substantially oval shaped opening 22 centrally thereof which is adapted to be closed by the butterfly valve 14'. The portion 20' of valve seat 16 comprises substantially parallel offset semicircular portions 24 and 26 which are connected by spaced substantially vertical portions 28.

Valve 14' is substantially flat, as shown in Fig. 2, is also of substantially oval construction and is somewhat larger than the opening provided in seat 16. Valve 14' is provided with diametrically opposed slots 30 along the short diameter thereof which in assembly receive the substantially vertical portions 28 of valve seat 16, as shown in Fig. 1. In assembly one end of valve 14' is inserted through the opening 22 and is then turned about its major axis bringing the slots 30 into registering position with the side edge of the upper portion 20' of valve seat 16. The valve is then positioned, as shown in Fig. 2, so that the slots receive the substantially vertical portions 28. When assembled the portion of valve 14' disposed to the right of slots 30 engages the upper surface of the lower offset portion 26 of valve seat 16 while the portion to the left of said slots engages the lower surface of the upper offset portion 24 of said seat. Valve 14' has secured to the under surface thereof a bracket 32 to which the upper end of actuating member 34 is connected by means of a pivot pin 36. Pivot pin 36 is disposed to the right of the slots 30 and vertical portions 28 and, accordingly, upon upward movement of the member 34 valve 14' will be swung in a counterclockwise direction. During this movement the corner 38 of valve 14' engages the adjacent surface of vertical portions 28 and forms therewith a sliding pivot for said valve. When the member 34 is moved downwardly the corner 40 at the opposite side of the slot slidably engages adjacent vertical surface of members 28 and causes the valve to swing clockwise about the pivotal connection thus formed to closed position.

Fig. 3 shows a generally similar construction. In this construction a slight projection 45 is provided on the upper of the offset portions 24 of valve seat 16 adjacent the vertical portions 28. A projection 45 is provided at either side of the offset portion 24 and the two projections act as limit stops to prevent movement of the valve 14' along the said portion 24 after having been moved to its fully open position. Otherwise, the construction shown in Fig. 3 is similar to that shown in Figs. 1 and 2.

Figs. 4 and 5 illustrate a further embodiment of the present invention. In this construction the upper portion 20' of valve seat 16 is substantially flat, as shown in Fig. 4. The valve 14', however, is provided with offset parallel substantially semicircular portions 46 and 48 which are connected by a substantially vertical portion 50. Aligned slots 52 are provided along the shorter diameter of valve 14' and receive the inner edge 54 of valve seat 16. Projections 56 and 58 are provided on the portion 20' of valve seat 16 at points spaced slightly from opposite sides of the vertical portion 50 of valve 14'. When valve 14' is assembled on the seat, as previously described, projections 56 and 58 act as limit stops to prevent sliding movement of the said valve therealong. This structure, except for the changes just described is also generally similar to those shown in Figs. 1 to 3.

It will be observed, in each of the embodiments just described, that the associated valve element is simply provided with aligned slots for receiving the edge of the valve seat, the side walls of which pivot about the vertical section 28 in the structures shown in Figs. 1 to 3 and about the upper and lower surfaces of the edge of the valve seat in the structure shown in Fig. 4. No other structure is necessary to provide for pivotal movement of the valve between open and closed positions.

It therefore is seen that simplified and highly improved shaftless valve structures have been provided. While but only three embodiments of the invention have been shown and described herein, it is apparent that it may be embodied in other forms without departing from the invention. It therefore is to be understood that it is not intended to limit the invention to the specific embodiments herein shown and described but only by the scope of the claims which follow.

What is claimed is:

1. A valve structure comprising a valve seat member having a continuously curved and inwardly extending edge defining a generally oval shaped opening, a valve element having substantially diametrically aligned slots provided therein and receiving said edge to thereby provide a pivotal support for said valve, said parts being so constructed that when said valve element is in closed position one part thereof engages the upper side of said valve seat member and another part thereof engages the under side of said seat member.

2. A valve structure comprising a valve seat member having a continuously curved and inwardly extending edge defining an elongated opening, a valve member for closing said opening having aligned slots extending inwardly at opposite sides thereof and receiving the said edge to form a pivotal support for said valve member, and one of said members comprising offset substantially parallel portions engaging opposite surfaces of the other when said valve structure is closed.

3. A valve structure comprising a valve seat element having a continuously curved and inwardly extending edge defining an elongated opening, a valve element having substantially diametrically aligned slots provided therein and receiving said edge to thereby provide a pivotal support for said valve element, said parts being so constructed that when said valve element is in closed position portions thereof engage opposite and parallel sides of said valve seat element, and stop means integral with one of said elements for limiting the movement of said valve element along said valve seat element.

4. A valve structure comprising a valve seat member having a continuously curved and inwardly extending edge defining an elongated opening, a valve element having substantially aligned slots provided in the margins thereof receiving said edge to thereby provide a pivotal support for said valve element, said parts being so constructed that when said valve element is in closed position a portion thereof on one side of said valve seat member engages the upper side of said valve seat member and a portion on the other side of said valve seat member engages the under side of said seat member, and stop means on said valve seat member for limiting the movement of said valve element along said valve seat member.

5. A valve structure comprising a valve seat member having a continuous and smooth edge defining an opening of oval configuration, a valve member associated with said opening and having aligned slots in the margins thereof and retaining the said edge at the smallest width of said opening to form a pivotal support for said valve member, one of said members comprising offset substantially parallel portions and a connecting portion disposed at an angle to said offset portions and passing through said slots, whereby when said valve member is in closed position one of said offset portions engages the upper surface of said seat member and said other offset portion engages the under surface of said seat member, and stop means for limiting movement of said valve member along said valve seat member.

6. A shaftless valve structure comprising a flat substantially circular valve seat member having an inwardly extending flange defining an opening of substantially oval shape, a substantially oval shaped valve element larger than said opening and adapted to close the latter by engaging said flange, said valve element comprising a pair of offset substantially parallel portions and a connecting portion disposed at an angle to said offset portions, said connecting portion having slots at the opposite ends thereof and retaining said flange to provide a pivotal support for said valve element whereby said offset portions may be swung toward and away from said flange, and means provided on said flange for limiting movement of the said pivotal support.

7. A shaftless valve structure comprising a substantially cylindrical intermediate portion, an inwardly extending flange formed at one end of said intermediate portion and defining an opening of oval configuration, said flange comprising offset substantially parallel portions connected by portions disposed at an angle to said offset portions, a second flange provided at the other end of said intermediate portion for securing said seat structure in position, and a valve member larger than said opening having aligned slots retaining said inwardly extending flange and by means of which said flange and valve member are in pivotal relation.

References Cited in the file of this patent
UNITED STATES PATENTS

| | | |
|---|---|---|
| 802,110 | Peterman | Oct. 17, 1905 |
| 1,346,887 | Heald | July 20, 1920 |
| 1,976,720 | Engels | Oct. 16, 1934 |
| 2,493,736 | Brown | Jan. 10, 1950 |
| 2,569,359 | Vellinga | Sept. 25, 1951 |
| 2,742,051 | Chanda | Apr. 17, 1956 |